United States Patent
Chung

(10) Patent No.: US 9,821,604 B1
(45) Date of Patent: Nov. 21, 2017

(54) QUICK-RELEASE CONNECTOR FOR CONNECTING A WHEEL TO A LEG OF A BARBECUE GRILL

(71) Applicant: Shu-Jui Chung, Taichung (TW)

(72) Inventor: Shu-Jui Chung, Taichung (TW)

( * ) Notice: Subject to any disclaimer, the term of this patent is extended or adjusted under 35 U.S.C. 154(b) by 0 days.

(21) Appl. No.: 14/969,764

(22) Filed: Dec. 15, 2015

(51) Int. Cl.
*B60B 35/00* (2006.01)
*B62K 25/02* (2006.01)
*A47J 37/07* (2006.01)

(52) U.S. Cl.
CPC ......... *B60B 35/004* (2013.01); *A47J 37/0786* (2013.01); *B62K 25/02* (2013.01); *B60B 2900/115* (2013.01); *B60B 2900/541* (2013.01)

(58) Field of Classification Search
CPC ..... B60B 35/004; B60B 35/04; B60B 27/026; B62K 25/02; B62K 2025/025; A47J 37/0786
See application file for complete search history.

(56) References Cited

U.S. PATENT DOCUMENTS

| | | | | |
|---|---|---|---|---|
| 5,238,297 A | * | 8/1993 | Sanders | B60B 37/10 |
| | | | | 301/111.06 |
| 5,441,286 A | * | 8/1995 | Pozzobon | A63C 17/226 |
| | | | | 280/11.223 |
| 6,863,282 B2 | * | 3/2005 | Greber | A63C 17/226 |
| | | | | 280/11.223 |
| 9,360,037 B2 | * | 6/2016 | Wang | F16B 5/0088 |
| 9,493,034 B1 | * | 11/2016 | Ueda | B60B 27/026 |
| 2003/0025386 A1 | * | 2/2003 | Brake | B60B 35/004 |
| | | | | 301/111.06 |
| 2008/0211295 A1 | * | 9/2008 | Bartlett | B62K 25/02 |
| | | | | 301/124.2 |

* cited by examiner

*Primary Examiner* — Kip T Kotter

(57) ABSTRACT

A quick-release connector includes an axle, a spring, a lever and a pin. The axle includes a slit in an end, an axial bore in communication with the slit, and a transverse channel in communication with the slit. The spring is inserted in the axial bore. The lever includes a slot with a longitudinal section and a transverse section. The pin is inserted in the transverse channel and the slot to pivotally connect the lever to the axle.

5 Claims, 5 Drawing Sheets

QUICK-RELEASE CONNECTOR FOR CONNECTING A WHEEL TO A LEG OF A BARBECUE GRILL

BACKGROUND OF INVENTION

1. Field of Invention

The present invention relates to a barbecue grill and, more particularly, to a quick-release connector for connecting a wheel to a leg of a barbecue grill.

2. Related Prior Art

There is a grill including four wheels to render the grill movable on the wheels. Each of the wheels is connected to a corresponding one of the legs by a combination of a threaded bolt with a nut. However, it requires one wrench or two and takes a while to adequately engage the threaded bolt with the nut. Hence, the production of the grill is slow, and the cost is high.

The present invention is therefore intended to obviate or at least alleviate the problems encountered in prior art.

SUMMARY OF INVENTION

It is the primary objective of the present invention to provide a quick-release connector for connecting a wheel to a leg of a barbecue grill.

To achieve the foregoing objectives, the quick-release connector includes an axle, a spring, a lever and a pin. The axle includes a slit in an end, an axial bore in communication with the slit, and a transverse channel in communication with the slit. The spring is inserted in the axial bore. The lever includes a slot with a longitudinal section and a transverse section. The pin is inserted in the transverse channel and the slot to pivotally connect the lever to the axle to allow the lever to pivot relative to the axle between a first position and a second position. In the first position, the lever is co-linear with the axle so that the lever can be inserted throughout the wheel and the leg and located out of the leg or the wheel while the axle is inserted in the wheel and the leg. In the second position, the lever extends perpendicular to the axle and abuts against a side of the leg or the wheel. The lever is rectilinearly movable relative to the axle to a third position from the second position so that the pin is moved to the transverse section of the slot from the longitudinal section of the slot. Automatically, the spring moves the lever relative to the axle from the third position to a fourth position where the pin is located in an end of the transverse section of the slot to keep the lever in position.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
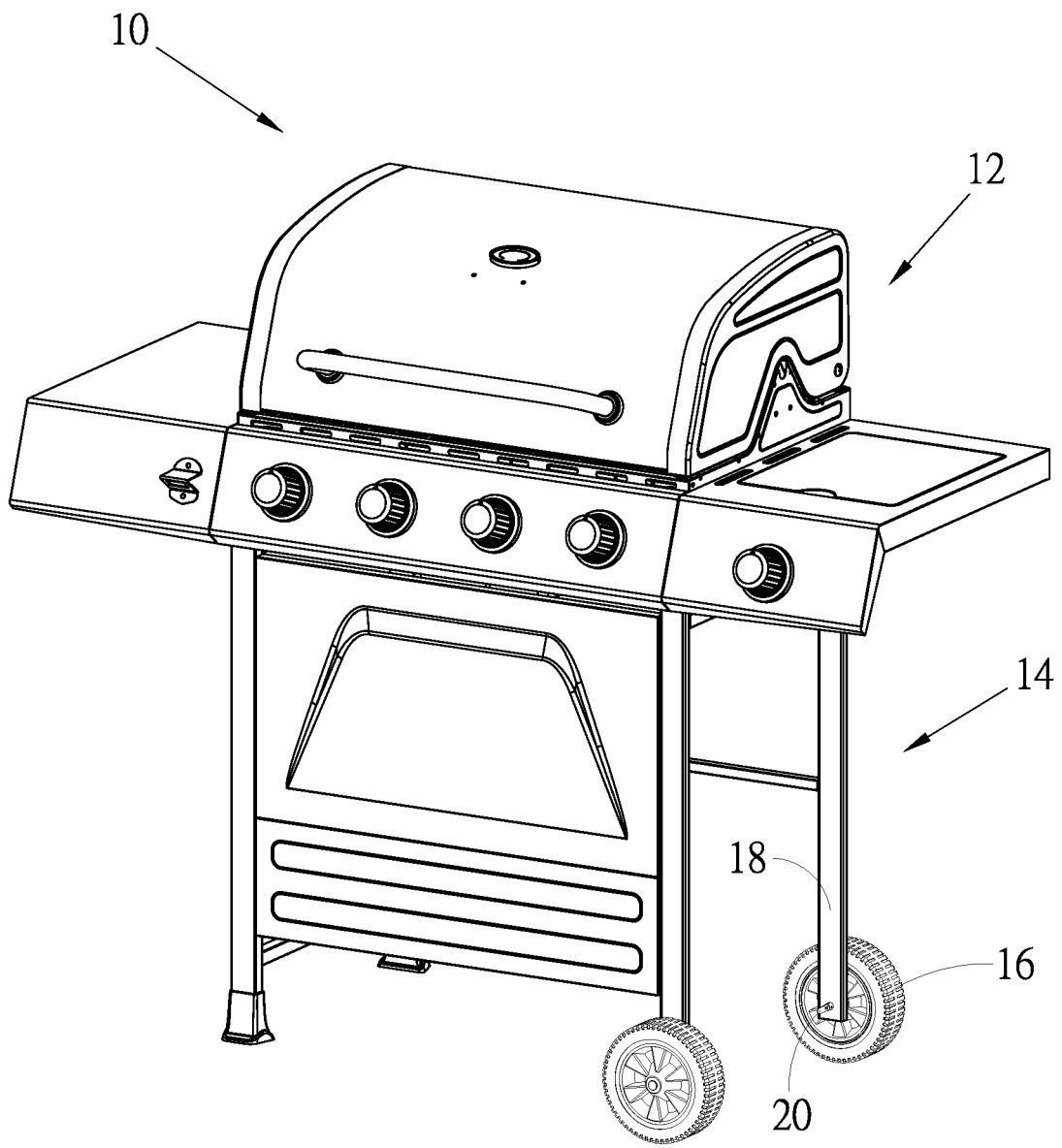
FIG. 1 is a perspective view of a grill including four wheels attached to four legs by four quick-release connectors according to the preferred embodiment of the present invention.
Figure 2:
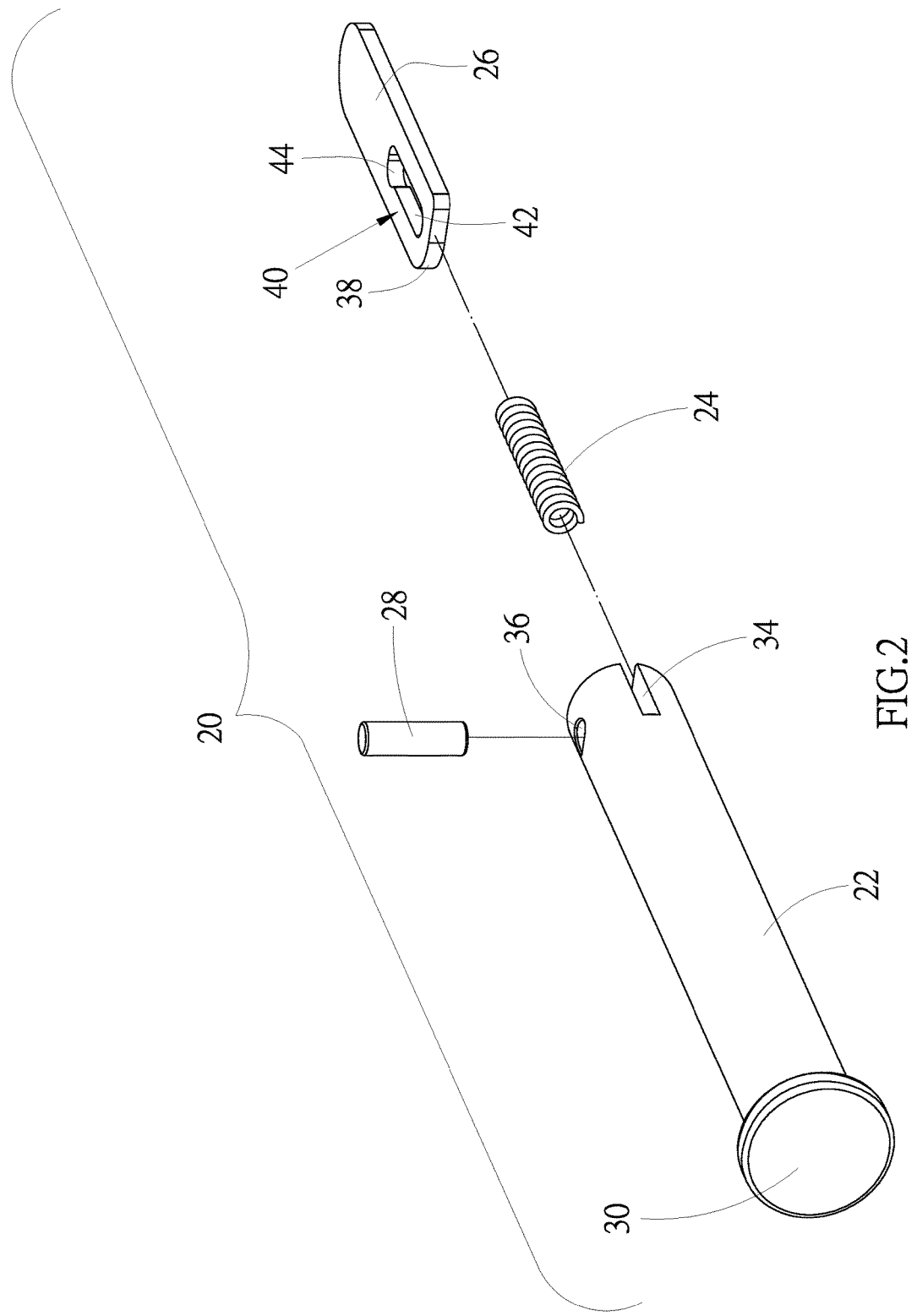
FIG. 2 is an exploded view of an exemplary one of the quick-release connectors shown in FIG. 1.
Figure 3:
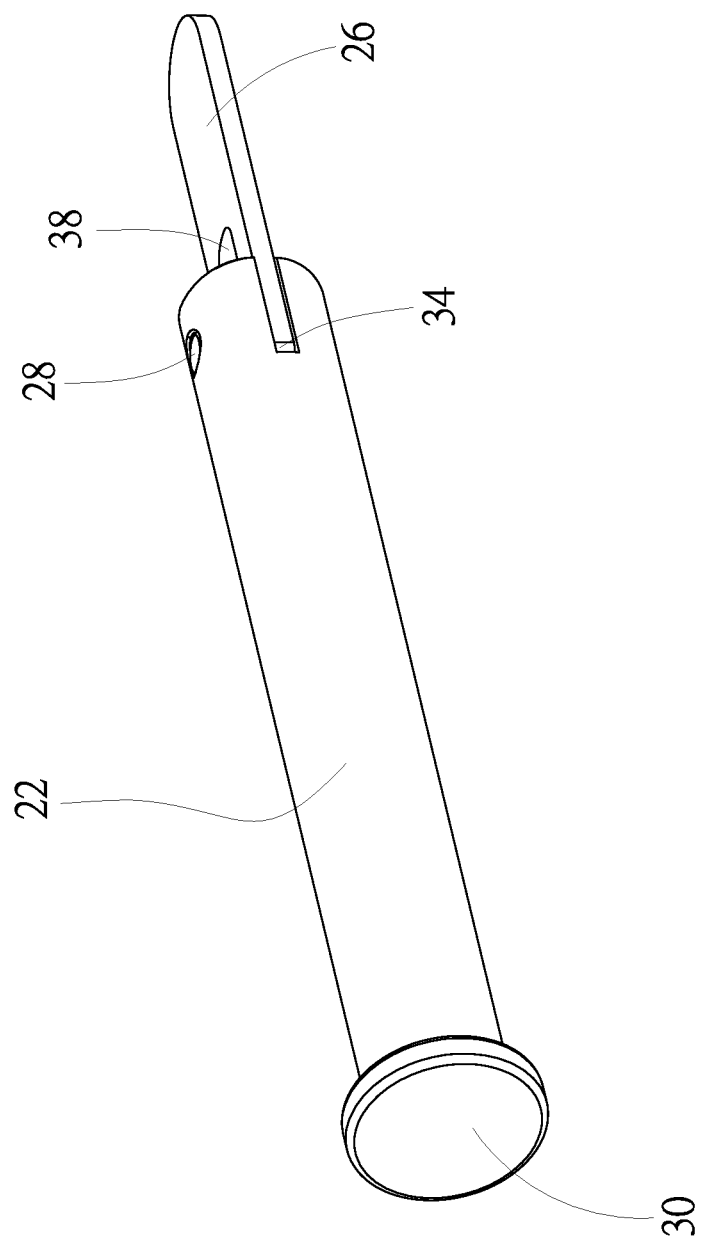
FIG. 3 is a perspective view of the quick-release connector shown in FIG. 2.

Referring to FIG. 1, a barbecue grill 10 includes an oven 12 supported on a frame 14. The frame 14 includes two wheels 16 connected to two legs 18 by four quick-release connectors 20 according to the preferred embodiment of the present invention. For briefness and clarity, the following description will be given to only an exemplary one of the wheels 16, an exemplary one of the legs 18 and an exemplary one of the quick-release connectors 20.

Referring to FIGS. 2 to 5, the quick-release connector 20 includes an axle 22, a spring 24, a lever 26 and a pin 28. The axle 22 includes an enlarged head 30 formed at a first end, an axial bore 32 near a second end, a slit 34 in the second end, and a transverse channel 36 near the second end. Both of the axial bore 32 and the transverse channel 36 are in communication with the slit 34.

The spring 24 is preferably a helical spring. The spring 24 is preferably a compression spring.

The lever 26 includes a chamfer 38 formed at a first end and a slot 40 near the first end. The slot 40 is an L-shaped slot that includes a longitudinal section 42 and a transverse section 44. The longitudinal section 42 extends much longer than the transverse section 44 does.

In assembly, the spring 24 is inserted in the axial bore 32 before the first end of the lever 26 is inserted in the slit 34. The pin 28 is inserted in the transverse channel 38 and the slot 40. Preferably, the pin 28 is fitted in the transverse channel 38. Thus, the lever 26 is pivotally connected to the axle 22.

Figure 4:
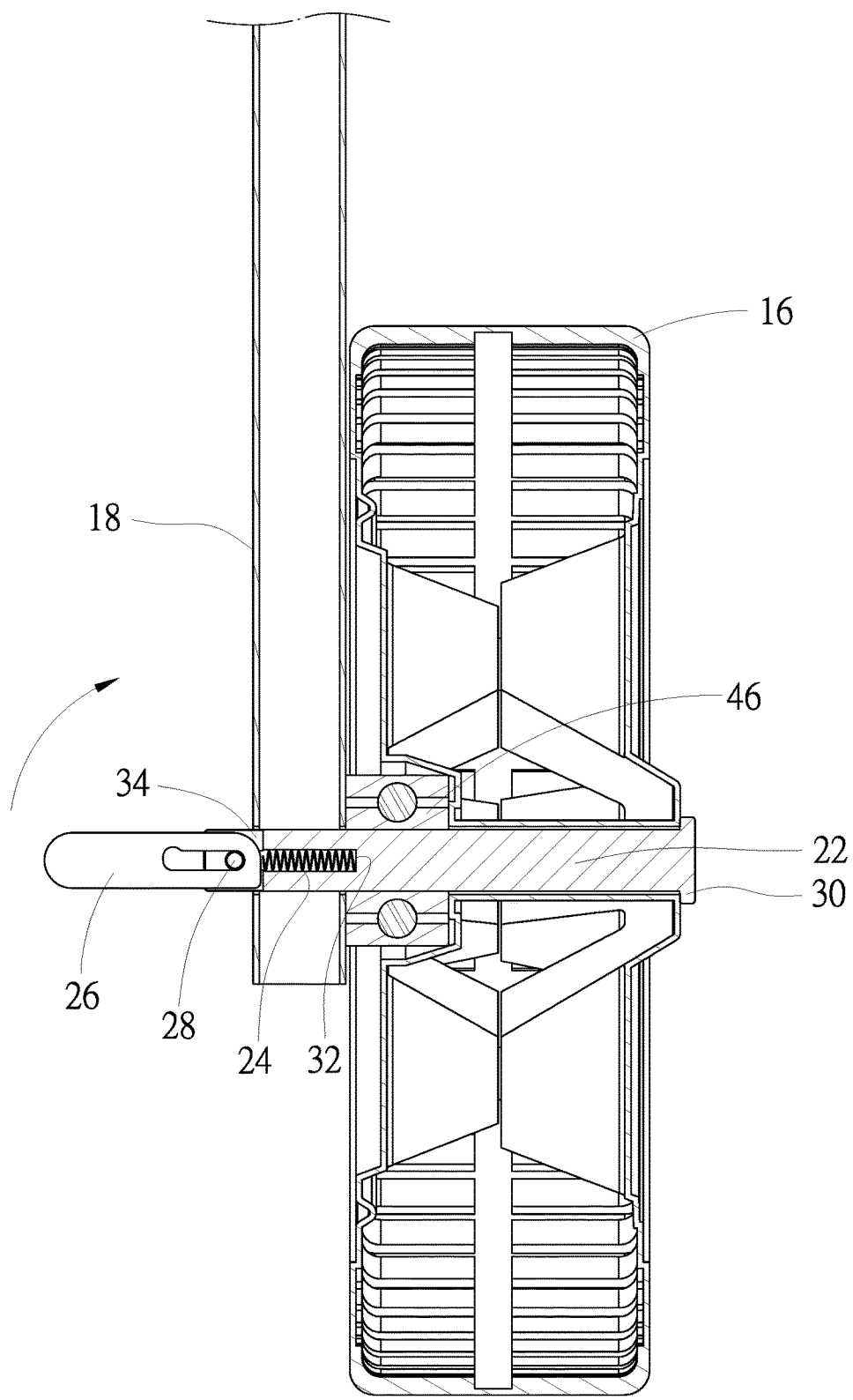
FIG. 4 is a cross-sectional view of an exemplary one of the wheels, an exemplary one of the legs and an exemplary one of the quick-release connectors shown in FIG. 1.

Referring to FIG. 4, the lever 26 is in a position so that it is co-linear with the axle 22. The lever 26 is inserted throughout the wheel 16, a bearing 46 of the wheel 16 and the leg 18 so that the lever 26 lever is located out of the leg 18. The axle 22 is inserted in the wheel 16 and the bearing 46. The enlarged head 30 is abutted against the wheel 16 to stop further insertion of the axle 22.

Figure 5:
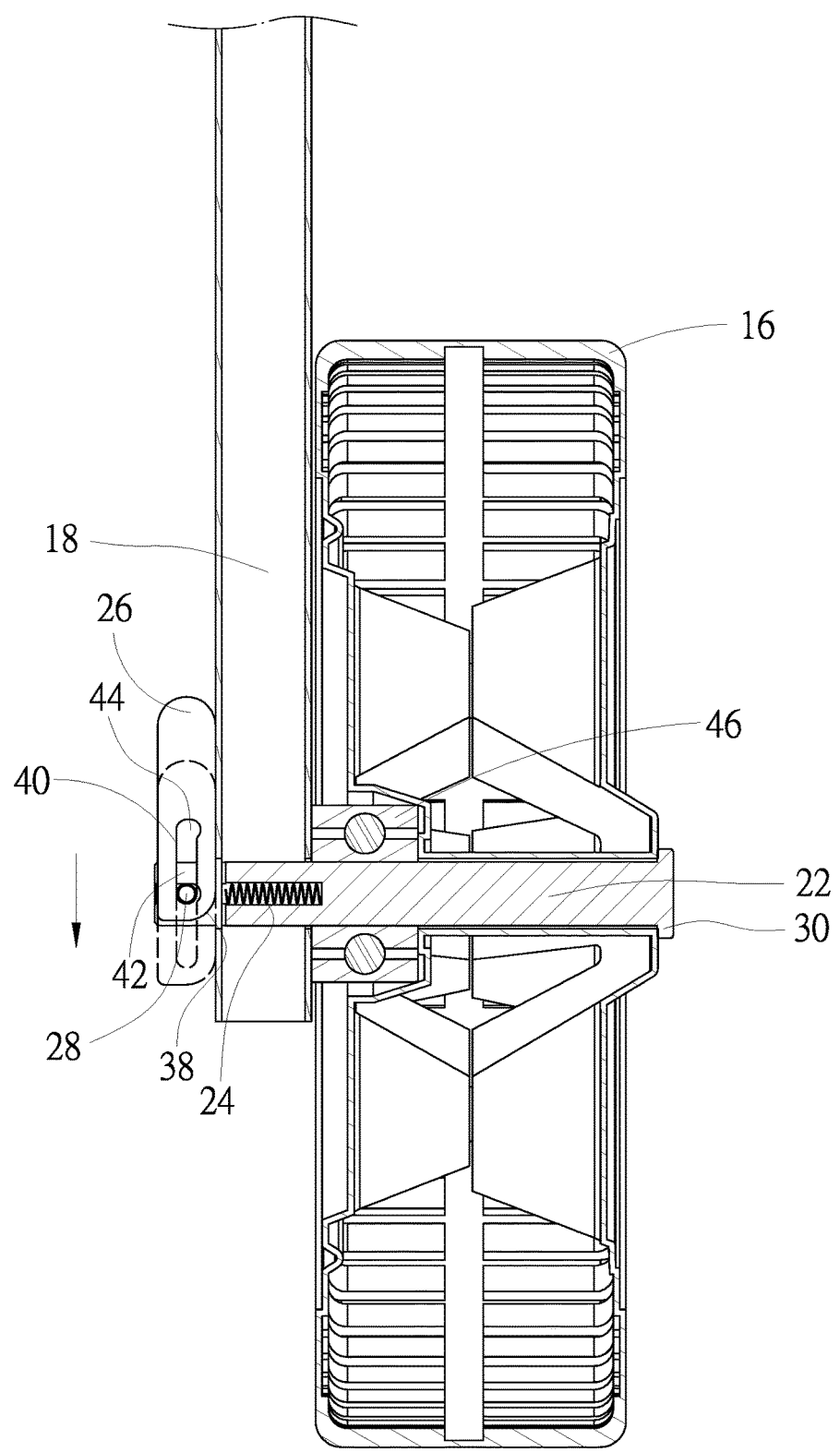
FIG. 5 is a cross-sectional view of the wheel, the leg and the quick-release connector in another position than shown in FIG. 4.

Referring to FIG. 5, the lever 26 is pivoted to another position so that it extends perpendicular to the axle 22. The pivoting of the lever 26 is rendered smooth due to the use of the chamfer 38 that smoothly slides on the axle 22. The pin 28 is located in the longitudinal section 42 of the slot 40. Then, the lever 26 is longitudinally moved downwards relative to the axle 22 so that the pin 28 is located in the transverse section 44 of the slot 40. The spring 24 automatically causes the lever 26 to pivot or transversely move to move the pin 28 to a closed end of the transverse section 44 of the slot 40 along the transverse section 44 of the slot 40. Thus, the lever 26 is kept in position. Hence, the axle 22 is kept in the wheel 16, the bearing 46 and the leg 18.

Unlike any conventional quick-release connector, the quick-release connector 20 does not include any cam formed on the lever 26 or a pusher formed with a recess for receiving such a cam, but includes the slot 40 made in the lever 26. This renders the quick-release connector 20 small and renders it possible to insert the lever 26 throughout the wheel 16, the bearing 46 and the leg 18.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A quick-release connector comprising:
   an axle comprising a slit in an end, an axial bore in communication with the slit, and a transverse channel in communication with the slit;
   a compression spring inserted in the axial bore;
   a lever comprising a slot with a longitudinal section and a transverse section; and
   a pin inserted in the transverse channel and the slot to pivotally connect the lever to the axle to allow the lever to pivot relative to the axle between a first position and a second position, wherein in the first position, the lever is co-linear with the axle so that the lever can be inserted throughout an object and located out of the object while the axle is inserted in the object, wherein in the second position, the lever extends perpendicular to the axle and abuts against a side of the object, wherein the lever is rectilinearly movable relative to the axle to a third position from the second position so that the pin is moved to the transverse section of the slot from the longitudinal section of the slot, wherein the compression spring automatically moves the lever relative to the axle from the third position to a fourth position where the pin is located in an end of the transverse section of the slot to keep the lever in position.

2. The quick-release connector according to claim 1, wherein the axle comprises an enlarged head formed at another end and adapted for abutment against another side of the object.

3. The quick-release connector according to claim 1, wherein the spring is a helical spring.

4. The quick-release connector according to claim 1, wherein the lever includes a chamfer adapted for sliding on the axle to render smooth the pivoting of the lever.

5. The quick-release connector according to claim 1, wherein the longitudinal section of the slot extends longer than the transverse section of the slot does.

* * * * *